United States Patent [19]

Weil

[11] Patent Number: 4,763,929
[45] Date of Patent: Aug. 16, 1988

[54] ERASABLE MARKER SYSTEM

[76] Inventor: George Weil, "Southwinds", 69 Dennis Lane, Stanmore, Middlesex, United Kingdom

[21] Appl. No.: 928,815

[22] Filed: Nov. 7, 1986

[30] Foreign Application Priority Data

May 21, 1986 [GB] United Kingdom ............... 8612377

[51] Int. Cl.$^4$ .............................................. B42D 15/00
[52] U.S. Cl. ...................................... 283/81; 434/410
[58] Field of Search ...................... 283/81, 1 R, 1 A; 434/410

[56] References Cited

U.S. PATENT DOCUMENTS

| | | | |
|---|---|---|---|
| 1,881,140 | 10/1932 | Settel | 434/410 |
| 4,011,665 | 3/1977 | Port | 434/410 |
| 4,589,685 | 5/1986 | Lazar | 434/410 X |

FOREIGN PATENT DOCUMENTS

| | | | |
|---|---|---|---|
| 1178213 | 5/1958 | France | 434/410 |
| 2055702 | 3/1981 | United Kingdom | 434/410 |

Primary Examiner—Paul A. Bell
Attorney, Agent, or Firm—Arnold S. Weintraub

[57] ABSTRACT

A marker device suitable for attachment to a video cassette or the like is disclosed, which marker device comprises an elongate laminar device having first and second faces on opposite sides of the device, the first face of which is adapted to be secured to a surface of, for example, a video cassette; and the second face of which includes a window through which indicia marked upon the device may be viewed; and, between said first and second faces, an arrangement of the type in which a first foil layer can be releasably attached to a second layer, points of attachment therebetween being visually distinctive and constituting said indicia; and means for separating said first and second layers so as to release said points of attachment and thereby erase said indicia. In another embodiment, the marker device comprises an elongate laminar device having opposed first and second faces, the first face of which comprises a peel-off protective strip covering an adhesive surface; and the second face of which includes two strips of material the ends of which are secured within the device and which when the materials are pressed together generate an image at the points of contact, and a cursor having a bar located between said strips and being slidable along the length of the device between the respective ends of said strips, and wherein said image can be erased by traversing said bar over the region where the image is located.

10 Claims, 2 Drawing Sheets

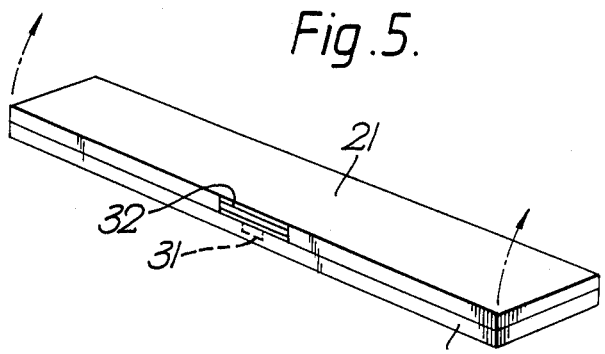
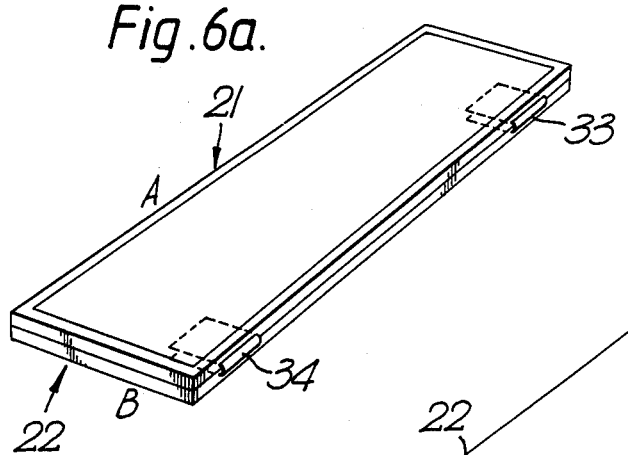
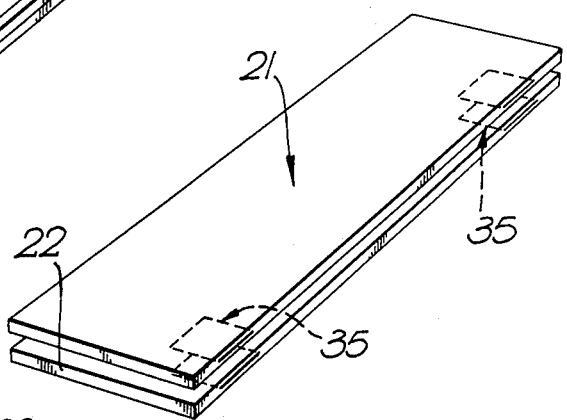
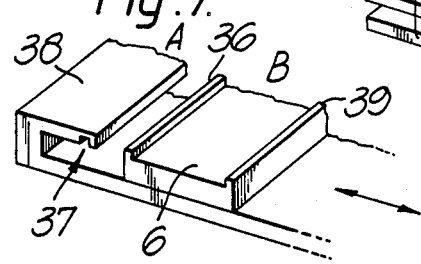
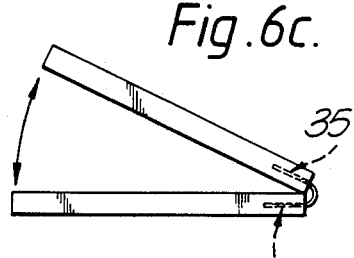
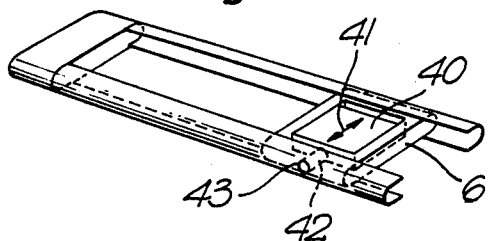

ERASABLE MARKER SYSTEM

This invention relates to an erasable marker or index system more particularly, but not exclusively, adapted for use on or in connection with video cassettes.

With the current popularity of home video recording, largely for the time-shifting of television broadcasts, it is common for a given video cassette to be used to record one particular programme and, after that programme has been viewed, for the same cassette to be re-used to record another programme. This presents problems for those who wish to store their video cassettes with an easily readable record of the programme material recorded on each cassette. There thus exists a need for a marker system usable with video cassettes which can readily be erased and re-written when a video cassette is re-used.

UK Patent Specification No. 2,132,979A (published July 18, 1984) discloses an erasable label for video or other cassettes which comprises an elongate label housing which may be attached to the back or spine of a cassette by means of a pressure sensitive tape. The label housing has on one face a window through which a foil arrangement is visible. The foil arrangement comprises an acetate foil, a transparent paper or strip underneath the acetate foil and a lowermost wax foil. The transparent paper is releaseably stuck or bound to the wax foil under the writing pressure exerted upon the acetate foil. To erase the writing it is necessary to separate the transparent paper and the wax foil; for this purpose at least one dividing rail is provided intermediate the paper and wax foil and is located at the underside of a slider reciprocatingly movable within the window of the label housing. A particular feature described in this patent specification is the structure of the dividing rail which serves to separate the paper and wax foils. This is described and illustrated as formed of two plates or webs, each of which protrudes inwardly from a respective guiding or guide edge of the slider. Preferably, the plates or webs have a bias or pre-stress serving to brace or slidingly clamp the slider in the label housing. This is illustrated in FIG. 3 of the patent specification.

The structure described and illustrated in GB No. 2,132,979A has not proved to work satisfactorily. The two webs or plates which constitute the dividing rail tend to press against the wax foil which is located directly beneath them and this results in more or less permanent marking which obscures or obliterates any writing which is effected.

It is an object of the present invention to provide an erasable marker or index system of the type disclosed in GB No. 2,132,979A and which facilitates repeated writing and erasing operations without the generation of unwanted marks which can obscure or obliterate any indicia written upon the device.

According to one aspect of the present invention, there is provided a marker device suitable for attachment to a video cassette or the like, which marker device comprises an elongate laminar device having first and second faces on opposite sides of the device, the first face of which is adapted to be secured to a surface of, for example, a video cassette; and the second face of which includes a window through which indicia marked upon the device may be viewed; and, between said first and second faces, an arrangement of the type in which a first foil layer can be releasably attached to a second layer, points of attachment therebetween being visually distinctive and constituting said indicia; and means for separating said first and second layers so as to release said points of attachment and thereby erase said indicia.

In the present invention, a foil arrangement such as that described in GB No. 2,132,979A may be used. Thus the first layer can comprise an acetate foil overlying a transparent paper foil; and the second layer can comprise a wax foil or a wax layer. Conveniently, the second layer is secured to a basal plate the rear face of which constitutes the first face of the marker device of this invention which is intended for attachment (e.g. via an adhesive tape which may form part of the device) to a video cassette or the like.

While the invention will be described hereinafter with reference to its use in conjunction with video cassettes, it is to be understood that the invention is not limited to application with video cassettes. The marker device may be used in conjunction with any of the following: audio tapes, filing systems (e.g. on a paper file, on a filing cabinet or on a desk drawer), telephones and other communication media (e.g. as a note pad), retail goods (e.g. to convey information to the consumer), photography (e.g. attached to a camera case or strap and facilitating the noting down of exposure details), menus (e.g. to indicate the dish of the day), computers (e.g. on or near a keyboard or visual display unit), and display boards (e.g. in offices, hotels, factories and schools). Where the device of the invention is used in a display of large area, the overall display may comprise a plurality of smaller individual units constructed in accordance with this invention and disposed in the desired manner. If desired, a locking device can be attached to, or incorporated into, the means for separating the first and second layers in order to prevent unwanted erasure of the indicia displayed on the marker device at any given time.

The means for separating said first and second layers may be an element secured within the device, e.g. a bar, which extends across substantially the full width of the first and second layers without interruption, and which is slidable along the length of the marker device. Such a bar is preferably part of an envelope which encloses said first and second layers, the other (upper) part of the envelope being accessible from above the window of the device and being, for example, in the form of a cursor which runs over said first layer and acts to move said bar along the length of the marker device.

Alternatively, the means for separating said first and second layers may be constituted by a hinge arrangement running along or acting upon one longitudinal edge of the marker device, and a clasp or clip arrangement located at the other longitudinal edge of the marker device. With this embodiment, the first layer is held within a frame which includes the window of said second face, while said second layer is held within a frame which includes said first face. The clasp arrangement may take the form of two or more U-shaped spring clips which are inserted into appropriately sized slots in the two frames which together constitutes the marker device. Alternatively, an integral cast plastics hinge may be used.

According to a second aspect of the present invention, there is provided a marker device suitable for attachment to a video cassette or the like, which marker device comprises an elongate laminar device having opposed first and second faces, the first face of which comprises a peel-off protective strip covering an adhesive surface; and the second face of which includes two strips of material the ends of which are secured within the device and which when the materials are pressed together generate an image at the ponts of contact, and a cursor having a bar located between said strips and being slidable along the length of the device between the respective ends of said strips, and wherein said image can be erased by traversing said bar over the region where the image is located.

In another aspect, the invention provides a video cassette having secured to the spine thereof, or having integrally formed in the spine thereof, a marker device which comprises an elongate laminar device the exposed face of which carries two strips of material the ends of which are secured within the device and which when the materials are pressed together generate an image at the points of contact, and a cursor having a bar located between said strips and being slidable along the length of the device between the respective ends of said strips, and wherein said image can be erased by traversing said bar over the region where the image is located.

Preferably, the two strips have above them a tough, transparent protective strip formed, for example, of an acetate (e.g. "Cellophane" - Registered Trade Mark) or of polyethylene terephthalate or other polyester material. The cursor preferably has a finger-operable bar located above the strips, so that the upper strip and the overlying protective strip are positioned in a slot or space formed between the two bars of the cursor.

In the present invention, the generation of local pressure e.g. by the tip of a ballpoint pen causes the first layer (e.g. a transparent paper strip) to adhere to the second layer, which will generally be a dark wax surface, thus altering the visual appearance of the device at the point where pressure was applied. It is thus possible to write indicia on the device to give an indication of the programme material is erased and the cassette is re-recorded, the first and second layers are separated, e.g. by moving a cursor along the length of the device, thus erasing the indicia carried by the device.

For a better understanding of the invention, and to show how the same may be carried into effect, reference will now be made, by way of example, to the accompanying drawings, in which:

FIG. 4b is an end elevational view of the device of FIG. 4a;

FIG. 5 is a perspective view of a third embodiment in accordance with the invention;

FIGS. 6a, 6b and 6c are views of a fourth embodiment in accordance with the invention;

FIG. 7 is an illustration of a locking arrangement for use with the embodiment of FIG. 1; and FIG. 8 illustrates an alternative locking arrangement.

Figure 1:
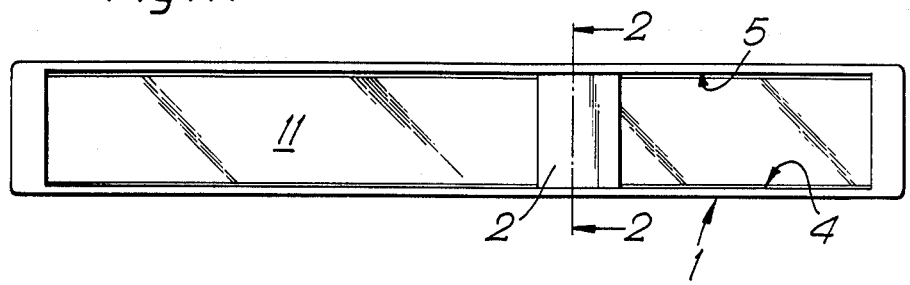
FIG. 1 is a plan view of a first embodiment in accordance with the invention.

Referring to the drawings, the device comprises a moulded plastics frame 1 which carries a cursor 2 on one face and a peel-off protective strip 3 on the opposite face. The cursor 2 runs in a track 4,5 and includes upper and lower members or bars 6 and 7, respectively. These define between them a gap 8. The parts 6 and 7 are firmly bonded together at their areas of contact on either side of the gap 8. The bed of the track 4, 5 within frame 1 is coated with a layer of wax 9. A small gap 10 exists between the lower surface of member 7 and layer 9. It will be appreciated that the two gaps 8 and 10 are differentiated from one another only in the region where the cursor is located at any given time.

Figure 3:
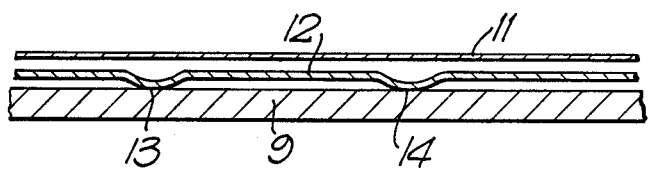
FIG. 3 is an enlarged schematic sectional view of part of the device of FIG. 1.

Housed within frame 1 so as to pass through gap 8 are two elongate strips the upper of which is a transparent acetate or Mylar (Registered Trade Mark) foil and is depicted in FIG. 1 as 11. The lower of the two strips 12 (see FIG. 3) is formed of a transparent paper material. Application of pressure in local regions causes the paper foil 12 to adhere to the wax surface of layer 9, as shown in FIG. 3 by the regions 13 and 14. These regions represent image elements or indicia and are visually discernible from the remainder of the composite layer 11, 12. In the region where the cursor is located, the layers 11 and 12 are located within gap 8.

In order to erase an image element such as formed at 13 or 14 shown in FIG. 3, the cursor 2 is traversed over the region of the image element; the lower bar 7 of the cursor lifts paper foil 12 away from the wax surface layer 9, thus eliminating the points of contact such as 13 and 14 which produce the visible image.

Although described above as a separate device intended for attachment to the spine of a video cassette, it will be appreciated that the device may be formed integrally with the cassette itself. The device, in these circumstances, will have the same features as just described except that there will be no need for the protective peel-off strip 3.

Figure 4A:
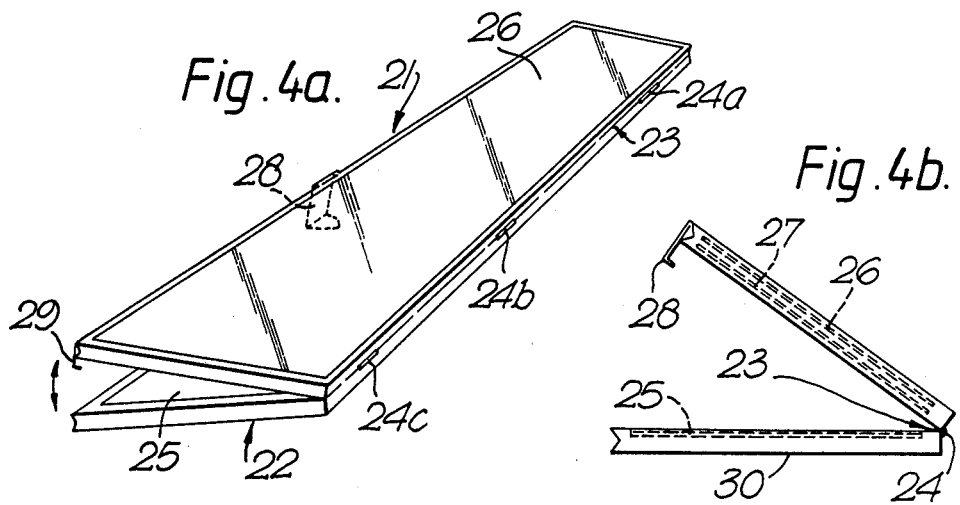
FIG. 4a is a perspective view of a second embodiment in accordance with the invention.
Figure 4B:
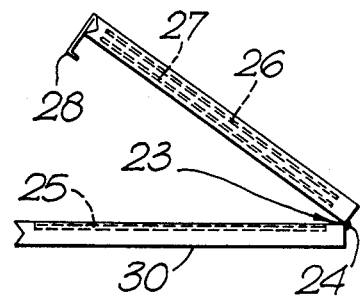

Referring now to FIGS. 4a and 4b, a second embodiment of a device in accordance with the invention is constructed in two-part form, the upper frame 21 being connected to lower frame 22 along a longitudinal edge 23. The two frames 21 and 22 are formed of a plastics material, and the hinge at 23 is a cast plastics hinge. Projections 24a, 24b and 24c are provided at spaced locations along hinge 23 so as to limit the extent of rotation (opening) about hinge axis 23. Lower frame 22 carries a wax bed 25. Upper frame 21 carries an acetate foil 26 (e.g. of "Cellophane" - Registered Trade Mark) which overlies a transparent paper foil 27. A clip 28 is secured to upper frame 21 on the longitudinal edge opposite hinge 23. A finger groove 29 is provided along the same edge as that which carries clip 28. The rear face 30 of lower frame 22 carries an adhesive film which may be protected by a tear-off strip (not shown, but analogous to strip 3 of FIG. 1).

In order to mark indicia on the device of FIGS. 4a and 4b, a ball-point pen or similar device is impressed upon the cellophane and paper layers 26, 27 when the two frame parts 21 and 22 are locked together via clip 28. As with the embodiment shown in FIGS. 1 and 2, this results in the paper layer 27 adhering to wax bed 25 at points where the ball-point has contacted the upper acetate foil 26. In order to erase indicia formed in this way, clip 28 is released and the upper frame member 26 is pivoted about hinge 23 so as to separate it from lower frame 22. The blocks 24a, 24b and 24c limit the extent of opening of the structure to an angle of about 45° which is sufficient to erase all indicia from the device.

FIG. 5 shows a third embodiment of the invention which, in its mode of operation and general construction, is similar to that described above with reference to FIGS. 4a and 4b. In the embodiment of FIG. 5, however, the connection between upper frame 21 and lower frame 22 is effected by means of a clip 31 which fits into a recess formed in the edge of lower frame 22. A thumb groove 32 is cast in the centre of the outside edge of upper frame 21 in order to facilitate lifting and separation of frames 21 and 22.

Referring now to FIGS. 6a–6c, a further embodiment is illustrated which again is constructed and operates generally in the manner described with reference to FIGS. 4a and 4b. In the embodiment of FIG. 6, however, upper frames 21 and 22 are separate units, held together by U-springs 33 and 34. These fit into slots such as 35 formed in the body of frames 21 and 22. Preferably, two such springs are used to generate a hinging action between frames 21 and 22. When the frames are held together, springs 33 and 34 are compressed and, when a connecting arrangement (such as clip 28 of FIG. 4a) is released, the springs open to give the condition illustrated in FIG. 6c. It will be apparent that a clip-less arrangement is possible, provided that the springs 33 and 34 hold frames 21 and 22 together when they are in their relaxed state. Thus the two frames will be moved apart against the spring tension, thereby erasing any indicia marked upon the device, and the frames 21 and 22 will come together again under the natural bias of the springs.

Figure 2:
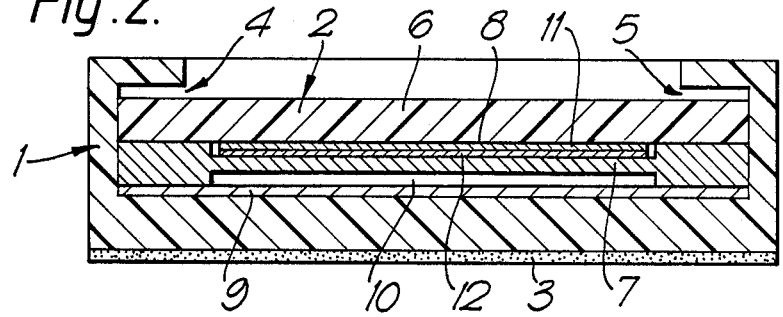
FIG. 2 is an enlarged schematic sectional view along the lines II—II of FIG. 1.

Referring next to FIG. 7, there is shown a locking arrangement which may be used in conjunction with the embodiment illustrated in FIGS. 1 and 2. In FIG. 7, the upper bar 6 of the cursor has, at one end, a raised ledge or ridge 36; the frame 1 has an end piece 38 the underside of which is formed at 37 with a groove designed to co-operate with ridge 36. Thus after indicia have been marked upon the device, the cursor 6 can be locked in position by pushing it underneath end piece 38 until ridge 36 clips into groove 37. Downward pressure on cursor 6 is sufficient to release ridge 36 from groove 37 when it is desired to erase the indicia marked on the device. Preferably, cursor 6 includes two such ridges, the second one being marked 39 in FIG. 7. A structure analogous to that of part 38 will then be provided at the opposite end of the marker device.

Referring lastly to FIG. 8, an alternative locking arrangement is shown schematically. In this system, a flat plate 40 fits into the top of cursor 6 and is able to slide laterally as indicated by arrow 41. Plate 40 includes a tooth-like projection 42 which, when the cursor is at one end of its travel, can co-operate with a hole or recess 43 provided in the frame of the device. Thus after indicia have been marked on the device, cursor 6 is locked at one end of the device by sliding plate 40 so that projection 42 locks in recess 43. The plate is slid in the opposite direction in order to unlock the cursor.

Conveniently, a device such as that shown in the drawings (for use with a video cassette) can be about 15 cm (5⅞ inches) long, 2 cm (¾ inch) wide and 0.15 cm (1/16 inch) thick, and the cursor 2 can conveniently be about 1.2 cm (½ inch) wide.

It will also be appreciated that a device in accordance with this invention may be used to display information other than that associated with the programme material recorded on a video cassette and may be attached to objects other than video cassettes, as described hereinbefore.

I claim:

1. An elongated laminar marker device, which comprises:
    an upper frame which carries a cover face and a paper foil layer, the cover face overlaying the paper foil layer, the cover face having a window through which indicia marked upon the device may be viewed;
    a lower frame which carries a wax layer, the wax layer being cooperable with the paper foil layer;
    means for releasably attaching the upper frame and the lower frame together, thereby enabling points of attachment to be generated between the paper foil layer and the wax layer which are visually distinctive and which constitute the indicia; and
    means for separating the upper frame from the lower frame so as to release the points of attachment and thereby erase the indicia.

2. A marker device as claimed in claim 1, wherein said means for separating said first and second layers is constituted by a hinge arrangement running along or acting upon one longitudinal edge of the marker device, and a clasp arrangement located at the other longitudinal edge of the marker device.

3. A marker device as claimed in claim 2, wherein said first layer is held in a first frame and said second layer is held in a second frame, and wherein said clasp arrangement comprises two U-shaped spring clips which are inserted into appropriately sized slots in said two frames.

4. A marker device as claimed in claim 2, wherein said hinge is an integral cast plastics hinge.

5. A marker device suitable for attachment to a video cassette, which marker device comprises:
    an elongated laminar device having a first face which includes a window through which indicia marked upon the device may be viewed;
    a paper foil layer and a wax layer, said wax layer being secured to a basal plate on the rear face of the marker device, said paper foil layer being sandwiched between said first face and said wax layer, said paper foil layer and said wax layer cooperating so that said paper foil layer can be releasably attached to said wax layer, points of attachment therebetween being visually distinctive and constituting said indicia; and
    a slidable cursor secured within the device which extends across substantially the full width of said paper foil layer and said wax layer without interruption, said cursor separating said paper foil and said wax layer so as to release said points of attachment and thereby erasing said indicia, said cursor moving along the length of the marker device, wherein said cursor has an integral first gap which extends across the full width of said first and second layers, wherein said first gap protects the wax layer from the cursor to facilitate repeated writing and erasing operations.

6. A device as claimed in claim 5, wherein said paper foil layer has above it a tough, transparent protective strip.

7. The device of claim 5, further comprising a second face which is on the opposite side of the device from the first face, the second face being adapted to be secured to the surface of a video cassette.

8. The device of claim 5, further comprising a locking means which prevents the cursor from sliding unless the cursor is disengaged from the locking means.

9. The device of claim 5, wherein said cursor has a finger-operable bar located above the upper frame, so that said layers are positioned within a second gap integral to said cursor.

10. A marker device suitable for attachment to a video cassette, which marker device comprises:

an elongate laminar device having first and second faces on opposite sides of the device, the first face of which is adapted to be secured to a surface of a video cassette, and the second face of which includes a window through which indicia marked upon the device may be viewed;

between said first and second faces, a transparent paper foil layer and a wax layer, said wax layer being secured to a basal plate the rear face of which constitutes the first face of the marker device, and said foil layer and said wax layer cooperating so that said foil layer can be releasably attached to said wax layer, points of attachment therebetween being visually distinctive and constituting said indicia; and means for separating said foil layer from said wax layer so as to release said points of attachment and thereby erase said indicia, the separating means comprising an element secured within the device which extends across substantially the full width of said foil layer and said wax layer without interruption and which is slidable along the length of the marker device.

* * * * *